United States Patent
Shin et al.

(10) Patent No.: US 10,460,506 B2
(45) Date of Patent: Oct. 29, 2019

(54) METHOD AND APPARATUS FOR GENERATING ACCELERATION STRUCTURE

(71) Applicant: Samsung Electronics Co., Ltd., Suwon-si, Gyeonggi-do (KR)

(72) Inventors: Young-sam Shin, Hwaseong-si (KR); Won-jong Lee, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/689,266

(22) Filed: Aug. 29, 2017

(65) Prior Publication Data
US 2018/0130249 A1    May 10, 2018

(30) Foreign Application Priority Data

Nov. 4, 2016 (KR) ......................... 10-2016-0146908

(51) Int. Cl.
| | |
|---|---|
| G06T 15/06 | (2011.01) |
| G06T 1/20 | (2006.01) |
| G06T 15/00 | (2011.01) |
| G06T 17/00 | (2006.01) |

(52) U.S. Cl.
CPC ............ *G06T 15/06* (2013.01); *G06T 1/20* (2013.01); *G06T 15/005* (2013.01); *G06T 17/005* (2013.01); *G06T 2210/12* (2013.01)

(58) Field of Classification Search
None
See application file for complete search history.

(56) References Cited

U.S. PATENT DOCUMENTS

| | | |
|---|---|---|
| 7,580,927 B1 | 8/2009 | Abugov et al. |
| 8,072,460 B2 | 12/2011 | Lauterbach et al. |
| 8,773,422 B1 | 7/2014 | Garland et al. |
| 8,780,112 B2 | 7/2014 | Kontkanen et al. |
| 2009/0096788 A1 | 4/2009 | Salsbury et al. |

(Continued)

FOREIGN PATENT DOCUMENTS

| | | |
|---|---|---|
| GB | 2493425 A | 2/2013 |
| JP | 2008/165760 A | 7/2008 |
| KR | 2014/0063429 A | 5/2014 |

OTHER PUBLICATIONS

Murphy, H. et al., "Hybrid Image-/Model-Based Gaze-Contingent Rendering," The Association for Computing Machinery, Inc., pp. 107-114, Jul. 26-27, 2007.

*Primary Examiner* — Said Broome
(74) *Attorney, Agent, or Firm* — Harness, Dickey & Pierce, P.L.C.

(57) ABSTRACT

A method for generating an acceleration structure used for ray tracing includes generating a linear code, the linear code representing a position of each of a plurality of primitives included in a three-dimensional (3D) space, arranging the plurality of primitives according to the generated linear code, determining a rate of change of a size of a generated bounding box while sequentially inputting the plurality of arranged primitives into the generated bounding box, selecting one of the plurality of arranged primitives based on the rate of change of the size of the generated bounding box and classifying the plurality of arranged primitives into a plurality of determined bounding boxes according to the selected primitive.

20 Claims, 11 Drawing Sheets

(56) References Cited

U.S. PATENT DOCUMENTS

| | | |
|---|---|---|
| 2009/0128562 A1 | 5/2009 | McCombe et al. |
| 2009/0219285 A1* | 9/2009 | Reshetov ................ G06T 15/06 345/420 |
| 2009/0322752 A1 | 12/2009 | Peterson et al. |
| 2010/0073369 A1 | 3/2010 | McCombe et al. |
| 2010/0079457 A1 | 4/2010 | Tavenrath |
| 2010/0188403 A1 | 7/2010 | Mejdrich et al. |
| 2011/0069067 A1 | 3/2011 | Ozdas et al. |
| 2011/0170557 A1 | 7/2011 | Aila et al. |
| 2012/0069023 A1 | 3/2012 | Hur et al. |
| 2013/0033507 A1 | 2/2013 | Garanzha et al. |
| 2014/0139534 A1 | 5/2014 | Tapply et al. |
| 2014/0340412 A1 | 11/2014 | Doyle et al. |
| 2014/0365532 A1 | 12/2014 | Karras et al. |
| 2015/0262416 A1 | 9/2015 | Hecht |
| 2015/0279092 A1 | 10/2015 | Ganestam et al. |
| 2015/0302629 A1* | 10/2015 | Obert ...................... G06T 15/06 345/426 |
| 2015/0317818 A1* | 11/2015 | Howson ................ G06T 15/005 345/424 |

\* cited by examiner

METHOD AND APPARATUS FOR GENERATING ACCELERATION STRUCTURE

CROSS-REFERENCE TO RELATED APPLICATION

This application claims the benefit of Korean Patent Application No. 10-2016-0146908, filed on Nov. 4, 2016, in the Korean Intellectual Property Office, the disclosure of which is incorporated herein in its entirety by reference.

BACKGROUND

1. Field

The present disclosure relates to methods and apparatuses for generating an acceleration structure used for ray tracing.

2. Description of the Related Art

Three-dimensional (3D) rendering is an image processing process for synthesizing 3D object data as an image viewed from a given view point of a camera. In a 3D rendering process, in order to represent an object more realistically, a ray tracing method may be used to determine data about the object based on a mode in which rays emitted from a preset light source are reflected by the object.

In the ray tracing method, in order to trace points at which rays intersect with objects to be rendered, an acceleration structure in which the objects are spatially classified may be generated and the generated acceleration structure may be traversed to determine the intersection between a ray and a primitive (ray-primitive intersection).

SUMMARY

However, since a traversal and intersection test process in the ray tracing method traces all the rays reflected by the objects, the test process uses a large amount of computation and a wide memory bandwidth. Accordingly, continuous research is conducted on a method of generating an acceleration structure for more efficiently performing a traversal and intersection test process in the ray tracing method.

Provided are methods and apparatuses for generating an acceleration structure used for ray tracing, which may increase a generation speed of the acceleration structure while maintaining the quality of the acceleration structure.

Additional aspects will be set forth in part in the description which follows and, in part, will be apparent from the description, or may be learned by practice of the presented embodiments.

According to an example embodiment, a method for generating an acceleration structure used for ray tracing includes generating a linear code, the linear code representing a position of each of a plurality of primitives included in a three-dimensional (3D) space, arranging the plurality of primitives according to the generated linear code, determining a rate of change of a size of a generated bounding box while sequentially inputting the plurality of arranged primitives into the generated bounding box, selecting one of the plurality of arranged primitives based on the rate of change of the size of the generated bounding box and classifying the plurality of arranged primitives into a plurality of determined bounding boxes according to the selected primitive.

According to another example embodiment, an apparatus for generating an acceleration structure used for ray tracing includes a memory storing the acceleration structure and information about a position of each of a plurality of primitives included in a three-dimensional (3D) space and a processor configured to arrange the plurality of primitives according to a linear code generated based on the information about the position of each of the plurality of primitives, determine a rate of change of a size of a generated bounding box while sequentially inputting the plurality of arranged primitives into the generated bounding box, select one of the plurality of arranged primitives based on the increase rate of the change of the size of the generated bounding box, and classify the plurality of arranged primitives into a plurality of determined bounding boxes by the selected primitive.

According to another example embodiment, a non-transitory computer-readable recording medium that stores a program, when executed by a computer, causes the computer to perform the above acceleration structure generating method when executed by a computer.

In at least another example embodiment, a method for generating an acceleration structure used for ray tracing includes generating a linear code, the linear code representing a position of each of a plurality of primitives included in a three-dimensional (3D) space, arranging the plurality of primitives according to the generated linear code, iteratively adding the plurality of primitives to a bounding box, each iterative addition being associated with a change of size of the bounding box, selecting one of the plurality of arranged primitives based on the change of size of the bounding box of each iterative addition and classifying the plurality of arranged primitives using the bounding box and a size of the bounding box associated with the selected primitive.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
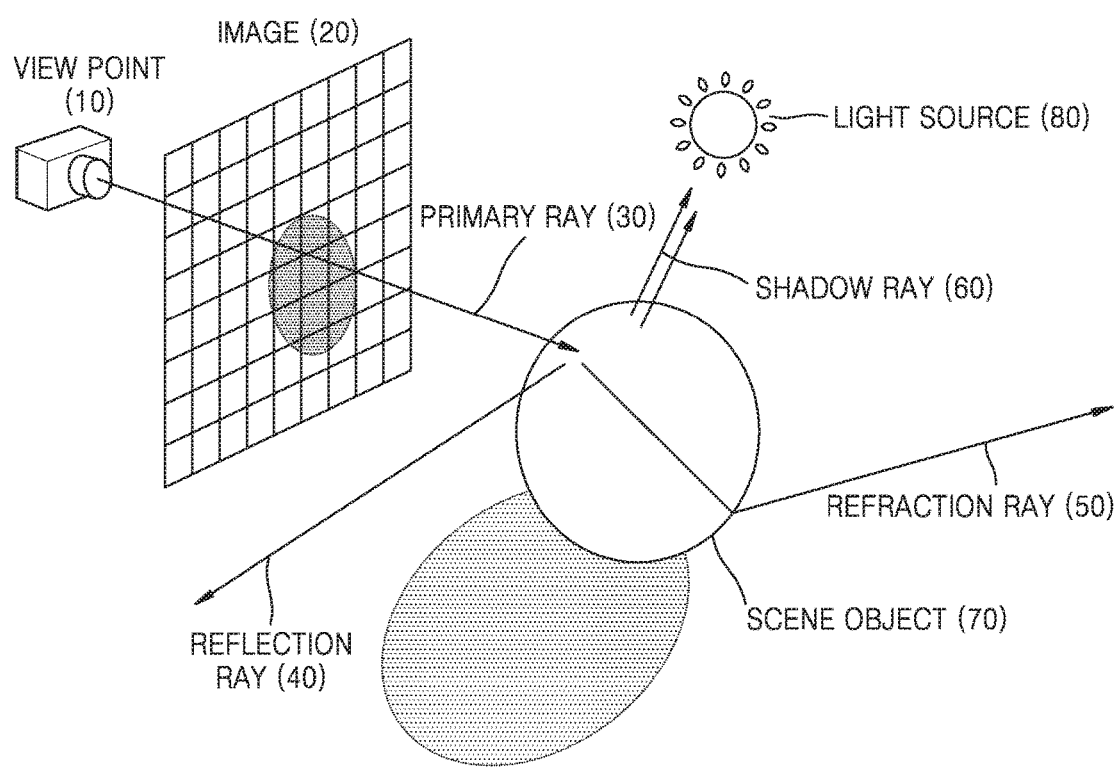
FIG. 1 is a diagram illustrating ray tracing, according to an example embodiment.

Reference will now be made in detail to example embodiments, examples of which are illustrated in the accompanying drawings, wherein like reference numerals refer to like elements throughout. In this regard, example embodiments may have different forms and should not be construed as being limited to the descriptions set forth herein. Accordingly, example embodiments described below, by referring to the figures, explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings.

FIG. 1 is a diagram illustrating ray tracing. Referring to FIG. 1, in three-dimensional (3D) modeling, a ray tracing core may determine a view point 10 and determine an image 20 according to the view point 10. When the view point 10 and the image 20 are determined, the ray tracing core may generate a ray for each pixel of the image 20 from the view point 10.

As illustrated in FIG. 1, a primary ray 30 may be generated from the view point 10. The primary ray 30 may pass the image 20 and then intersect a scene object 70. A reflection ray 40 and a refraction ray 50 may be generated at an intersection between the primary ray 30 and the scene object 70. Also, a shadow ray 60 may be generated at the intersection in a direction toward a light source 80. Herein, the reflection, refraction, and shadow rays 40, 50, and 60 will be referred to as secondary rays. The scene object 70 may refer to an object to be rendered with respect to the image 20. The scene object 70 may include a plurality of primitives.

The ray tracing core may analyze the primary ray 30, the secondary rays 40, 50, and 60, and rays derived from the secondary rays. The ray tracing core may determine the color values of pixels constituting the image 20 based on the analysis results. In this case, the ray tracing core may determine the color values of the pixels in consideration of the characteristics of the scene object 70.

Figure 2:
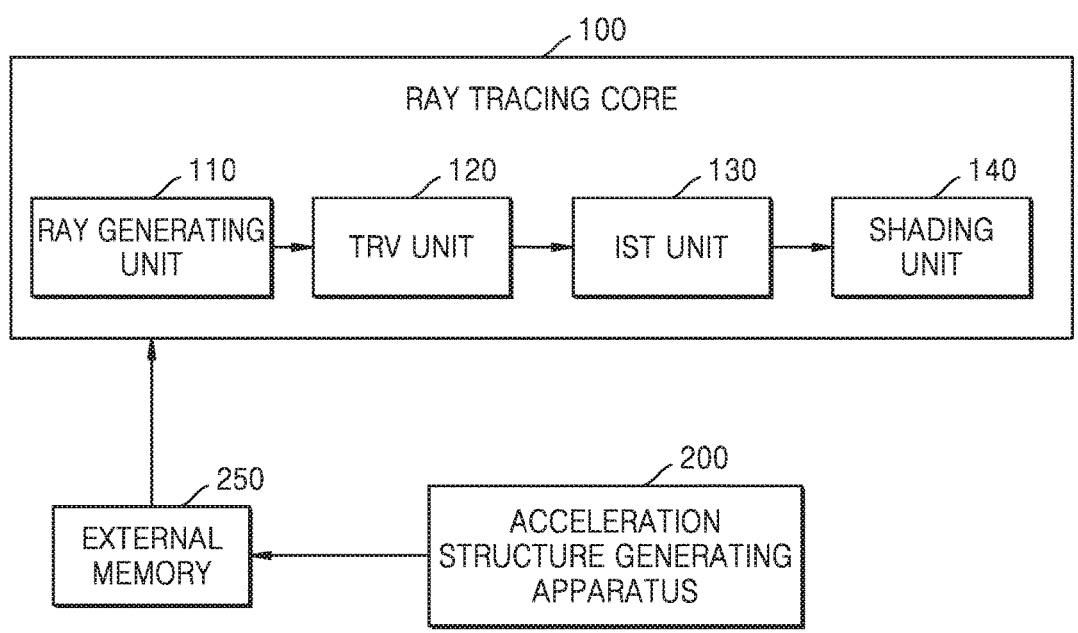
FIG. 2 is a diagram illustrating a ray tracing core, according to an example embodiment.

FIG. 2 is a diagram illustrating a ray tracing core 100. Referring to FIG. 2, the ray tracing core 100 may include a ray generating unit 110, a traversal (TRV) unit 120, an intersection test (IST) unit 130, and a shading unit 140. Although FIG. 2 illustrates that the TRV unit 120 and the IST unit 130 are included in the ray tracing core 100, the TRV unit 120 and the IST unit 130 may be implemented as separate hardware units. FIG. 2 only illustrates the components of the ray tracing core 100 that are related to the present example embodiment. Thus, those of ordinary skill in the art will understand that other general-purpose components may be further included in addition to the components illustrated in FIG. 2.

The ray tracing core 100 may trace intersections between generated rays and objects located in a 3D space and determine the color values of pixels constituting an image. In other words, the ray tracing core 100 may find intersections between rays and objects, generate secondary rays according to the characteristics of the objects at the intersections, and determine the color values of the intersections.

The ray tracing core 100 may use the previous traversal results and the previous intersection test results when traversing an acceleration structure and performing an intersection test. In other words, the ray tracing core 100 may more rapidly perform the current rendering process by applying the performance results of the previous rendering process to the current rendering process.

The ray generating unit 110 may generate a primary ray and a secondary ray. The ray generating unit 110 may generate a primary ray from a view point and generate a reflection, refraction, or shadow secondary ray at an intersection between the primary ray and an object. The ray generating unit 110 may also generate another secondary ray at an intersection between the secondary ray and an object. The ray generating unit 110 may generate reflection, refraction, and shadow rays within a predetermined and/or desired number of times or determine the number of times of generating reflection, refraction, and shadow rays according to the characteristics of objects.

The TRV unit 120 may receive information about generated rays from the ray generating unit 110. The generated rays may include all of the primary ray, the secondary rays, and the rays derived from the secondary rays. For example, in the case of the primary ray, the TRV unit 120 may receive information about the view point and direction of the generated ray. Also, in the case of the secondary ray, the TRV unit 120 may receive information about the start point and direction of the secondary ray. The start point of the secondary ray may refer to a point where the primary ray is hit. The view point or the start point may be represented by coordinates, and the direction may be represented by a vector.

The TRV unit 120 may read information about the acceleration structure from an external memory 250. The acceleration structure may be generated by an acceleration structure generating apparatus (generator) 200, and the generated acceleration structure may be stored in the external memory 250. The acceleration structure may refer to a structure including position information of objects in the 3D space. For example, the acceleration information may include KD-tree (K-Dimensional tree) and BVH (Bounding Volume Hierarchy).

The TRV unit 120 may traverse the acceleration structure and output a leaf node or an object hit by a ray. For example, the TRV unit 120 may traverse nodes included in the acceleration structure and output a leaf node hit by a ray among the leaf nodes that are the lowest nodes among the nodes to the IST unit 130. In other words, the TRV unit 120 may determine which one of the bounding boxes constituting the acceleration structure is hit by the ray and determine which one of the objects included in the bounding box is hit by the ray. Information about the hit object may be stored in a TRV cache. The bounding box may refer to a unit including a plurality of objects or primitives and may be represented in different forms according to the acceleration structures. The TRV cache may refer to a memory for temporarily storing the data used by the TRV unit 120 in the traversal process.

The TRV unit 120 may traverse the acceleration structure by using the previous rendering results. The TRV unit 120 may traverse the acceleration structure along the same path as in the previous rendering process by using the previous rendering results stored in the TRV cache. For example, when traversing the acceleration structure for an input ray, the TRV unit 120 may first perform traversal on the bounding box hit by the previous ray having the same view point and direction as the input ray. Also, the TRV unit 120 may traverse the acceleration structure with reference to the traversal path for the previous ray.

The IST unit 130 may receive the leaf node or the object hit by the ray from the TRV unit 120 and read information about the primitives included in the hit object from the external memory 250. The read information about the primitives may be stored in an IST cache. The IST cache may refer to a memory for temporarily storing the data used by the IST unit 130 in the intersection test process.

The IST unit 130 may perform an intersection test between the ray and the primitive and output the intersection and the primitive hit by the ray. When receiving the object hit by the ray from the TRV unit 120, the IST unit 130 may check which one of the primitives included in the hit object is hit by the ray. After finding the primitive hit by the ray, the IST unit 130 may output an intersection indicating which point of the hit primitive is intersected by the ray. The intersection may be output in coordinate form to the shading unit 140.

The IST unit 130 may perform an intersection test by using the previous rendering results. The IST unit 130 may first perform an intersection test on the same primitive as in the previous rendering process by using the previous rendering results stored in the IST cache. For example, when performing an intersection test on an input ray, the IST unit 130 may first perform an intersection test on the primitive hit by the previous ray having the same view point and direction as the input ray.

The shading unit 140 may determine the color value of a pixel based on the material property of an intersection and the information about an intersection received from the IST unit 130. For example, the shading unit 140 may determine the color value of a pixel in consideration of the effect by a light source and the material basic color of an intersection.

The ray tracing core 100 may receive the data used for ray tracing from the external memory 250. The external memory 250 may store geometry data representing information about the primitives or the acceleration structured generated by the acceleration structure generating apparatus 200. The primitive may include a polygon such as a triangle or a tetragon, and the geometry data may refer to information about the positions and apexes of primitives included in an object.

The acceleration structure generating apparatus 200 may generate an acceleration structure including position information of objects in the 3D space. The acceleration structure generating apparatus 200 may generate various types of acceleration structures. For example, the acceleration structure may be of a type in which the 3D space is divided into hierarchical trees, and the acceleration structure generating apparatus 200 may generate a structure representing the relationship between objects in the 3D space by applying BVH or KD-tree. The acceleration structure generating apparatus 200 may determine the tree depth and the number of maximum primitives of the leaf node and generate an acceleration structure based on the determination.

Figure 3:
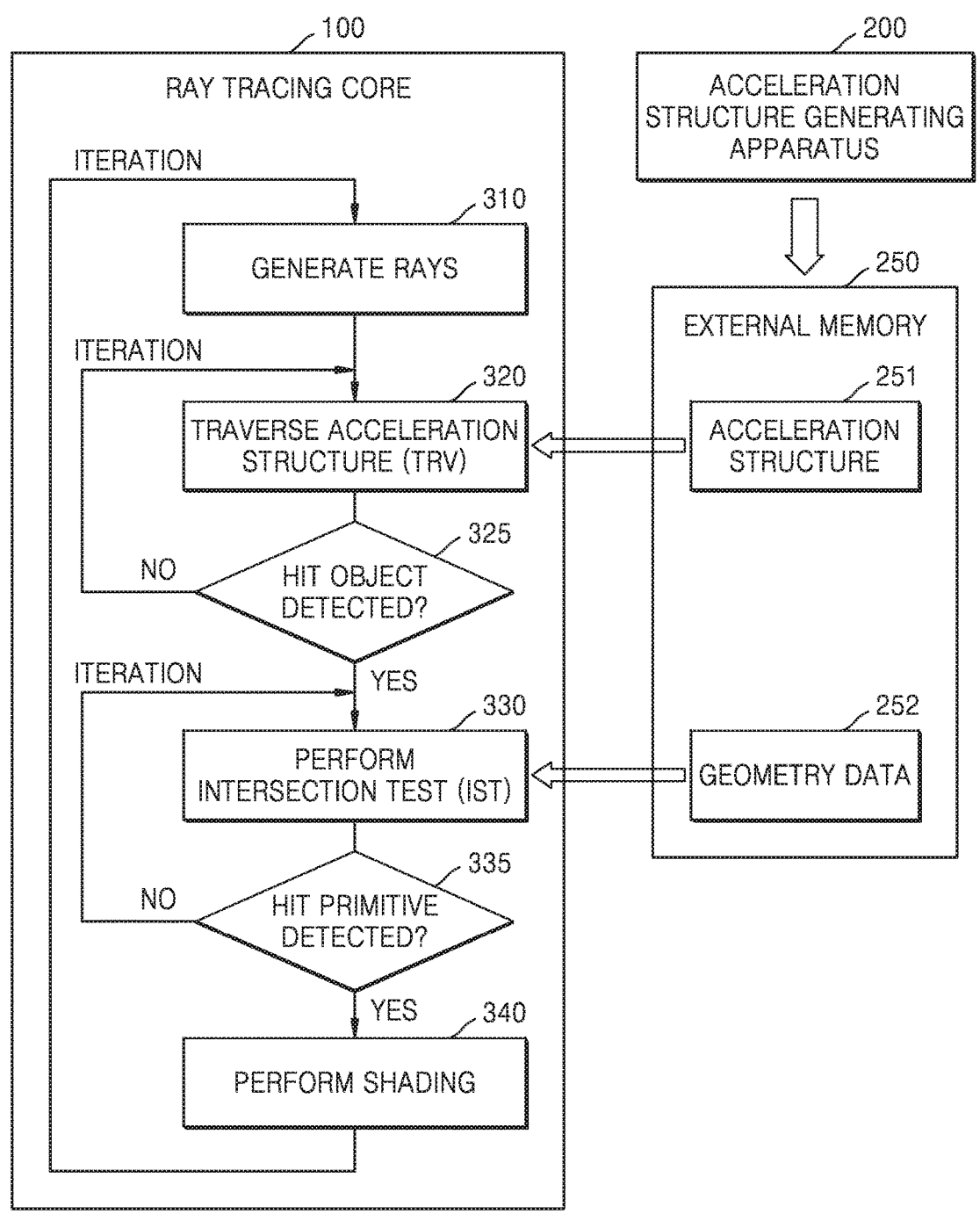
FIG. 3 is a diagram illustrating an operation of performing ray tracing by a ray tracing core, according to an example embodiment.

FIG. 3 is a diagram illustrating an operation of performing ray tracing by a ray tracing core. The ray tracing core may have, for example, the structure of the ray tracing core 100 illustrated in FIG. 2. Thus, although omitted below, the above description of the ray tracing core 100 may also be applied to the ray tracing method of FIG. 3.

In operation 310, the ray tracing core 100 may generate rays. The ray tracing core 100 may generate a primary ray, a secondary ray, and rays derived from the secondary ray.

In operation 320, the ray tracing core 100 may traverse an acceleration structure read from the external memory 250. The ray tracing core 100 may traverse an acceleration structure 251 based on the view points and directions of the generated rays, detect a bounding box hit by the ray, and detect an object hit by the ray among the objects included in the hit bounding box. The ray tracing core 100 may repeatedly traverse the acceleration structure 251 until detecting the hit object at operation 325. For example, the ray tracing core 100 may traverse the acceleration structure along a path and traverse the acceleration structure along another path when the leaf node on the traversed path is not hit by the ray.

The ray tracing core 100 may sequentially traverse all paths or may first traverse a particular path based on the previous ray traversal information. For example, when the view point and direction of the previous ray are identical or similar to the view point and direction of the current ray, the ray tracing core 100 may first traverse the path including the leaf node hit by the previous ray.

In operation 330, the ray tracing core 100 may perform an intersection test. The ray tracing core 100 may perform an intersection test based on geometry data 252 of the primitives read from the external memory 250. The ray tracing core 100 may repeatedly perform an intersection test until detecting the hit primitive at operation 335. For example, the ray tracing core 100 may perform an intersection test on a primitive and perform an intersection test on another primitive when the primitive is not hit by the ray.

The ray tracing core 100 may sequentially perform an intersection test on all primitives or may first perform an intersection test on a particular primitive based on the previous ray intersection test information. For example, when the view point and direction of the previous ray are identical or similar to the view point and direction of the current ray, the ray tracing core 100 may first perform an intersection test on the primitive hit by the previous ray.

In operation 340, the ray tracing core 100 may perform pixel shading based on the intersection test. Upon completion of operation 340, the ray tracing core 100 may proceed to operation 310. The ray tracing core 100 may repeatedly perform operations 310 to 340 on all pixels constituting an image.

Figure 4:
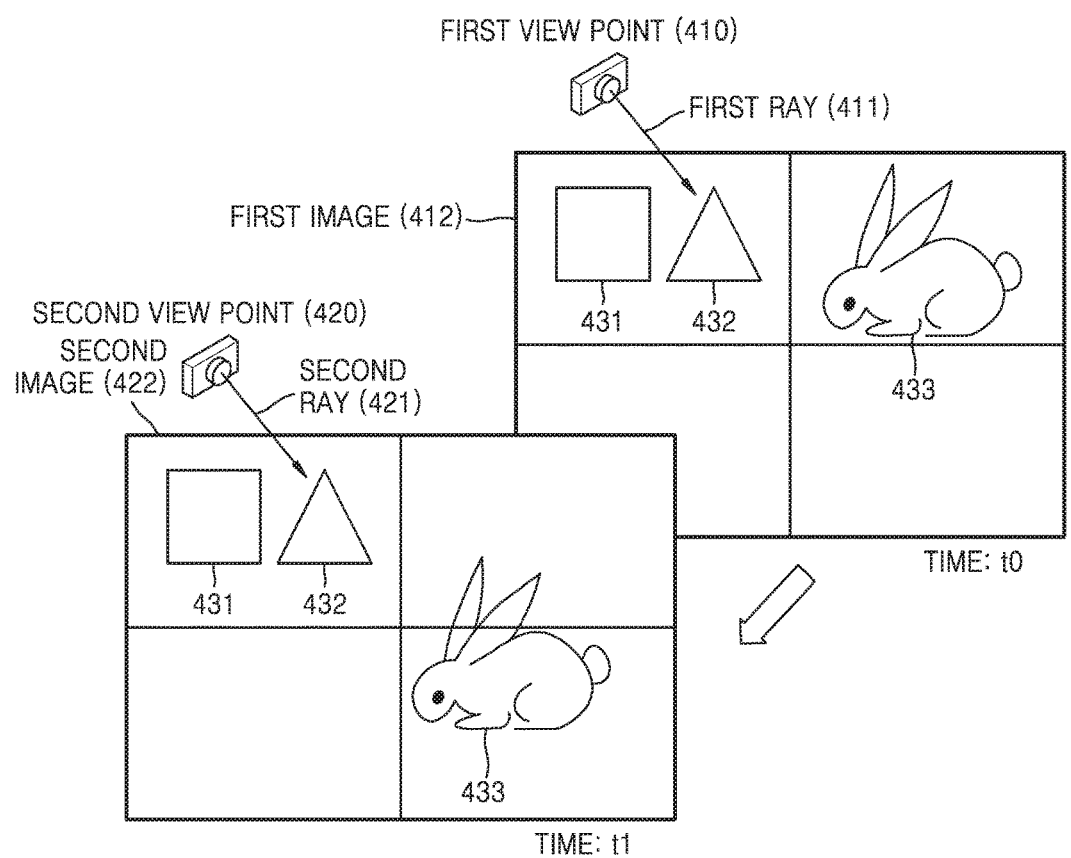
FIG. 4 is a diagram illustrating a method for accelerating ray tracing, according to an example embodiment.

FIG. 4 is a diagram illustrating a method for accelerating ray tracing. Referring to FIG. 4, a first image 412 may represent an image rendered at t=0, and a second image 422 may represent an image rendered at t=1. Since only a rabbit 433 moves and a tetragon 431 and a triangle 432 do not move in the first image 412 and the second image 422, the first image 412 and the second image 422 may be almost similar to each other. Thus, the ray tracing core 100 may perform rendering on the second image 422 by using the rendering results on the first image 412. For example, when the positions of a first view point 410 and a second view point 420 are identical to each other and the directions of a first ray 411 and a second ray 421 are identical to each other, the ray tracing core 100 may accelerate ray tracing on the second ray 421 by applying the ray tracing results on the first ray 411 to the ray tracing on the second ray 421. For example, when performing traversal on the second ray 421, the TRV unit 120 of the ray tracing unit 100 may first traverse the bounding box hit by the first ray 411. Also, when performing an intersection test on the second ray 421, the IST unit 130 of the ray tracing unit 100 may first perform an intersection test on the triangle 432 hit by the first ray 411.

Figure 5:
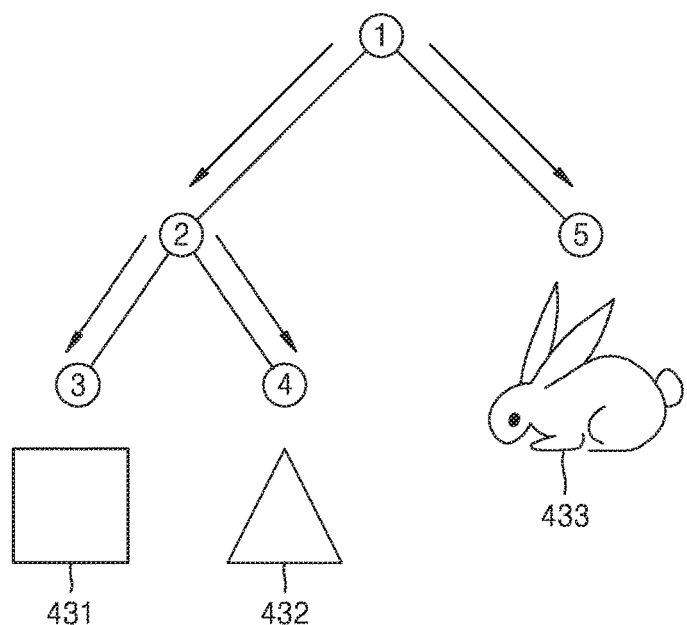
FIG. 5 is a diagram illustrating a method for accelerating the ray tracing of FIG. 4, according to an example embodiment.

FIG. 5 is a diagram illustrating a method for accelerating the ray tracing of FIG. 4. Referring to FIG. 5, an acceleration structure may include five nodes 1 to 5, and the nodes 3 to 5 may represent leaf nodes.

The TRV unit 120 may traverse the acceleration structure along three paths. First, the TRV unit 120 may traverse the acceleration structure along a first path including the node 1, the node 2, and the node 3. Second, the TRV unit 120 may traverse the acceleration structure along a second path including the node 1, the node 2, and the node 4. Third, the TRV unit 120 may traverse the acceleration structure along a third path including the node 1 and the node 5. In this case, when performing traversal on the second ray 421, the TRV unit 120 may first traverse the second path for traversing the triangle 432 hit by the first ray 411. Thus, the TRV unit 120 may skip a process of traversing the first path or the third path.

Figure 6:
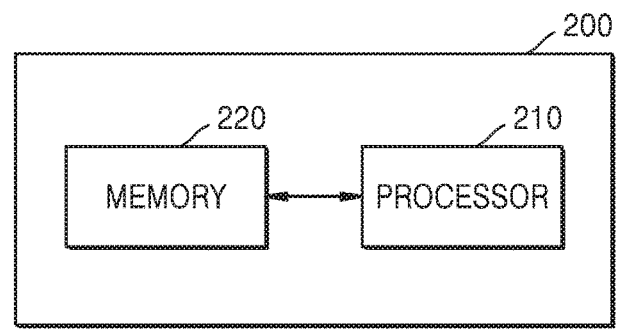
FIG. 6 is a block diagram illustrating an acceleration structure generating apparatus according to an example embodiment.

FIG. 6 is a block diagram illustrating an acceleration structure generating apparatus 200 according to an embodiment.

Referring to FIG. 6, the acceleration structure generating apparatus 200 may include a processor 210 and a memory 220. Herein, the acceleration structure generating apparatus 200 may include a graphic processing unit (GPU); however, this is merely an example and the acceleration structure generating apparatus 200 is not limited to the GPU.

The processor 210 may determine the position of a primitive included in a 3D space. According to an embodiment, the processor 210 may represent the position of the primitive based on the coordinates generated by dividing the 3D space into a plurality of grids. For example, the processor 210 may divide the 3D space at regular intervals in x-axis, y-axis, and z-axis directions. Herein, the position of the primitive may be represented by the position of the grid including the primitive. When the primitive is included in a plurality of grids, the position of the primitive may be represented by the position of the grid including the center of the primitive. A detailed method of determining and representing the position of the primitive will be described later with reference to FIG. 8.

The processor 210 may determine x-axis coordinates, y-axis coordinates, and z-axis coordinates composed of binary numbers in the 3D space of primitives. For example, the processor 210 may determine each of the x-axis coordinate, the y-axis coordinate, and the z-axis coordinate representing the position of the primitive by one or more binary bits included in a binary number.

The processor 210 may generate a linear code by combining, in a preset order, one or more binary bits included in the binary number representing the x-axis coordinate of the primitive, one or more binary bits included in the binary number representing the y-axis coordinate of the primitive, and one or more binary bits included in the binary number representing the z-axis coordinate of the primitive. Herein, the linear code may include a Morton code. Hereinafter, for convenience of description, a Morton code will be described as an example of the linear code.

The processor 210 may determine the order of combining the binary bits in order to generate a Morton code according to the distribution of the primitives included in the 3D space. Also, the processor 210 may differently set the respective numbers of binary bits of the x-axis coordinate, the y-axis coordinate, and the z-axis coordinate used to generate the Morton code.

The processor 210 may arrange a plurality of primitives according to the generated linear code. For example, according to the size of the value of the generated linear code, the processor 210 may arrange a plurality of primitives such that the primitive having the smaller linear code value may be located before the primitive having the greater linear code value.

Also, the processor 210 may determine the increase rate of the size of a bounding box while sequentially inputting the plurality of arranged primitives into the bounding box. For example, the processor 210 may sequentially input the plurality of arranged primitives into the bounding box until all primitives are included in the bounding box. The processor 210 may determine the increase rate of the size of the bounding box with respect to each of the plurality of primitives by comparing the sizes of the bounding box that increase as each of the plurality of arranged primitives is included in the bounding box. For example, the processor 210 may determine a change in size between a bounding box and a first bounding box associated with a sequentially inputted primitive relative to the first bounding box.

The processor 210 may select one of the plurality of arranged primitives based on the increase rate of the size of the bounding box. For example, the processor 210 may select the primitive largest in terms of the increase rate of the size of the bounding box among the plurality of arranged primitives. However, this is merely an example, and as another example, the processor 210 may select one of the plurality of arranged primitives based on the increase rate of the size of the bounding box and the weight preset for each of the plurality of primitives.

The processor 210 may classify the plurality of arranged primitives into a plurality of bounding boxes by the selected primitive. Also, the processor 210 may repeatedly perform a process of classifying the primitives included in each of the classified bounding boxes into other bounding boxes based on the increase rate of the size of the bounding box.

Also, the processor 210 may generate an acceleration structure representing the inclusion relation of bounding boxes. Each of the bounding boxes may correspond to each of the nodes included in the acceleration structure. For example, the processor may generate a first node corresponding to a first bounding box and generate a second node corresponding to a second bounding box.

Each node may include a data structure such as a struct, a union, and a class but is not limited thereto.

The processor 210 may add the first node and the second node to the acceleration structure as child nodes of a third node corresponding to the 3D space.

In the acceleration structure, a bounding box corresponding to a parent node may include a bounding box corresponding to a child node. Each bounding box may be classified into two bounding boxes. Thus, in general, the acceleration structure may be generated in binary tree form.

The memory 220 may store information about the acceleration structure and information about the position of each of the plurality of primitives included in the 3D space. The information about the acceleration structure may include information about the 3D space represented by the acceleration structure.

Figure 7:
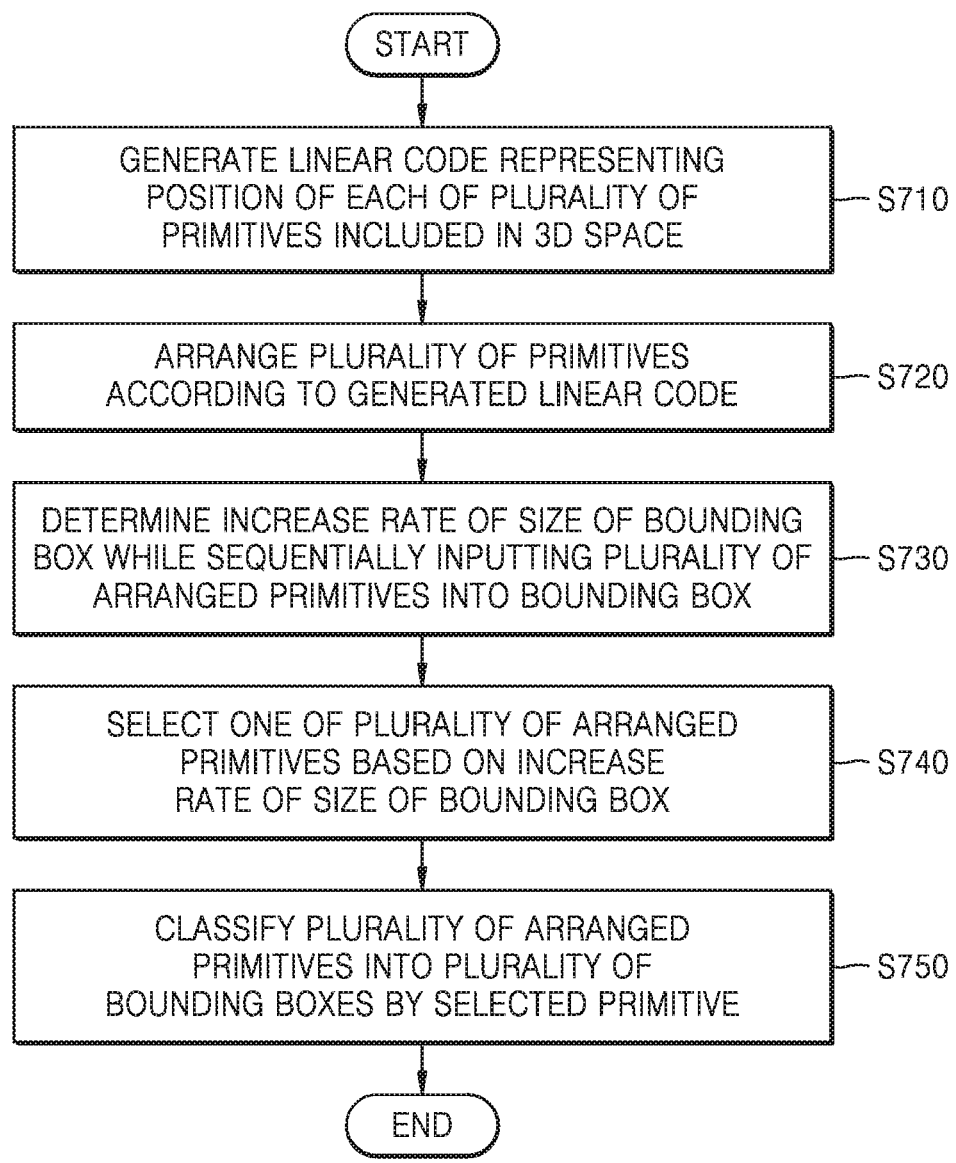
FIG. 7 is a flow diagram illustrating a method for generating an acceleration structure according to an example embodiment.

FIG. 7 is a flow diagram illustrating a method for generating an acceleration structure according to an embodiment. According to an embodiment, the acceleration structure generating method may be performed by the acceleration structure generating apparatus 200 as shown in FIG. 6 and may perform the same operations as the acceleration structure generating apparatus 200.

In operation S710, the acceleration structure generating apparatus 200 may generate a linear code representing the position of each of a plurality of primitives included in a 3D space.

According to an embodiment, the acceleration structure generating apparatus 200 may acquire information about the position of each of the plurality of primitives included in the 3D space. Herein, the information about the position may include, for example, the coordinates of the center of each of the plurality of primitives. As another example, the information about the position may include the coordinates of the center of the grid including each of the plurality of primitives.

Also, the acceleration structure generating apparatus 200 may generate a linear code representing an x-axis coordinate, a y-axis coordinate, and a z-axis coordinate of the primitive in the 3D space. Herein, the linear code may include a Morton code. For example, the acceleration structure generating apparatus 200 may generate a Morton code by combining, in a preset order, one or more binary bits included in the binary number representing the x-axis coordinate, one or more binary bits included in the binary number representing the y-axis coordinate, and one or more binary bits included in the binary number representing the z-axis coordinate. A method of generating the Morton code by the acceleration structure generating apparatus 200 will be described later in detail with reference to FIG. 8.

However, this is merely an example, and the linear code of the present embodiment is not limited to the Morton code.

In operation S720, the acceleration structure generating apparatus 200 may arrange a plurality of primitives according to the generated linear code. For example, according to the size of the value of the generated linear code, the acceleration structure generating apparatus 200 may arrange a plurality of primitives such that the primitive having the smaller linear code value may be located before the primitive having the greater linear code value. However, this is merely an example, and a method of arranging the plurality of primitives by the acceleration structure generating apparatus 200 is not limited thereto.

In operation S730, the acceleration structure generating apparatus 200 may determine the increase rate of the size of a bounding box while sequentially inputting the plurality of arranged primitives into the bounding box.

According to an embodiment, the acceleration structure generating apparatus 200 may input the plurality of primitives into the bounding box one by one according to the arrangement order. For example, the acceleration structure generating apparatus 200 may input a first primitive among the plurality of arranged primitives into the bounding box and may additionally input a second primitive arranged next the first primitive into the bounding box including the first primitive.

Also, the acceleration structure generating apparatus 200 may determine the size of the bounding box whenever each of the plurality of arranged primitives is input into the bounding box. For example, the acceleration structure generating apparatus 200 may determine the size of the bounding box into which the first primitive is input and the size of the bounding box into which the first primitive and the second primitive are input.

When the sizes of the bounding boxes are determined, the acceleration structure generating apparatus 200 may compare the size of the bounding box including the first primitive and the size of the bounding box including the first primitive and the second primitive. Based on the comparison result, the acceleration structure generating apparatus 200 may determine the increase rate of the size of the bounding box when the second primitive is input into the bounding box.

According to an embodiment, the acceleration structure generating apparatus 200 may sequentially input the plurality of arranged primitives into the bounding box until all primitives are included in the bounding box. Also, the acceleration structure generating apparatus 200 may determine the increase rate of the size of the bounding box with respect to each of the plurality of primitives by comparing the sizes of the bounding box when each of the plurality of arranged primitives is included in the bounding box.

In operation 3740, the acceleration structure generating apparatus 200 may select one of the plurality of arranged primitives based on the increase rate of the size of the bounding box.

According to an embodiment, the acceleration structure generating apparatus 200 may compare the increase rate of the bounding box with respect to each of the plurality of arranged primitives. Also, based on the comparison result, the acceleration structure generating apparatus 200 may select the primitive largest in terms of the increase rate of the bounding box among the plurality of arranged primitives. By selecting the primitive largest in terms of the increase rate of the bounding box, the acceleration structure generating apparatus 200 may select the primitive having the largest surface area among the plurality of arranged primitives.

However, this is merely an example, and the acceleration structure generating apparatus 200 may select one of the plurality of arranged primitives based on the increase rate and the weight preset for each of the plurality of primitives. This will be described later in more detail with reference to FIGS. 11 and 12.

In operation S750, the acceleration structure generating apparatus 200 may classify the plurality of arranged primitives into a plurality of bounding boxes by the selected primitive.

The acceleration structure generating apparatus 200 may classify the plurality of arranged primitives into a first bounding box including the selected primitive and at least one primitive arranged before the selected primitive and a second bounding box including at least one primitive arranged next to the selected primitive.

Also, according to an embodiment, the acceleration structure generating apparatus 200 may generate a first node corresponding to the first bounding box and a second node corresponding to the second bounding box. The acceleration structure generating apparatus 200 may add the first node and the second node to the acceleration structure as child nodes of a third node corresponding to the 3D space. Herein, the third node may be a root node or may be one of the child nodes added to the root node.

The acceleration structure generating apparatus 200 may classify the primitives included in each of the first bounding box and the second bounding box into other bounding boxes. For example, when three primitives are included in the first bounding box, the acceleration structure generating apparatus 200 may select the primitive largest in terms of the increase rate of the size of the bounding box while inputting each of the three primitives into the bounding box. The acceleration structure generating apparatus 200 may classify the first bounding box into a (1a)th bounding box and a (1b)th bounding box by the selected primitive. Also, the acceleration structure generating apparatus 200 may add the nodes corresponding to the (1a)th bounding box and the (1b)th bounding box to the acceleration structure as the child nodes of the first node.

The acceleration structure generating apparatus 200 may classify the plurality of arranged primitives into a plurality of bounding boxes while repeatedly performing the above operations S740 and S750.

Figure 8:
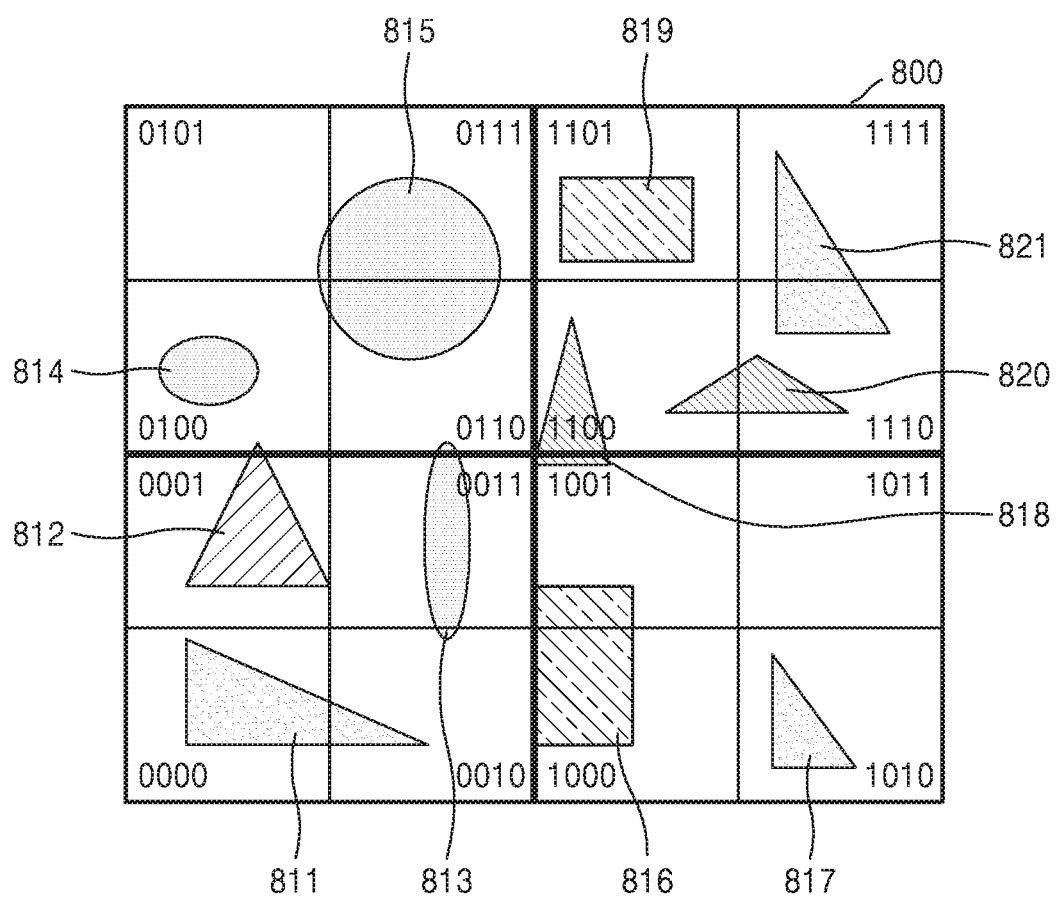
FIG. 8 is a diagram illustrating a method for generating a Morton code according to an example embodiment.

FIG. 8 is a diagram illustrating a method for generating a Morton code according to an embodiment. For convenience of description, a 3D space 800 is simplified and illustrated in two-dimensional (2D) form.

The acceleration structure generating apparatus 200 may linearly represent the positions of primitives included in the 3D space by using a Morton code.

Referring to FIG. 8, the acceleration structure generating apparatus 200 may uniformly divide each of the x axis and the y axis of the 3D space 800 into four. Thus, the acceleration structure generating apparatus 200 may divide the 3D space 800 into a total of 16 grids. Also, the acceleration structure generating apparatus 200 may generate coordinates by allocating a binary bit to each grid of the x axis and the y axis. For example, the acceleration structure generating apparatus 200 may allocate the coordinates of 00, 01, 10, 11 to four grids of the x axis and allocate the coordinates of 00, 01, 10, 11 to four grids of the y axis.

The acceleration structure generating apparatus 200 may represent the position of the primitive by using the coordinates of the grid including the primitive. As another example, the acceleration structure generating apparatus 200 may represent the position of the primitive by using the coordinates of the grid including the center of the primitive. In the present embodiment, the acceleration structure generating apparatus 200 represents the position of the primitive by using the coordinates of the grid including the center of the primitive.

Also, the acceleration structure generating apparatus 200 may generate a Morton code by combining the coordinate information of the grid including the primitive. According to an embodiment, when the x-axis coordinate of the primitive is represented as X1X2 and the y-axis coordinate of the primitive is represented as Y1Y2, the Morton code of the primitive may be represented as X1Y1X2Y2. Herein, each of X1, X2, Y1, and Y2 may be a binary bit representing each digit of a value representing the x-axis coordinate and the y-axis coordinate by binary numbers.

For example, in the case of a first primitive 811, since the x-axis coordinate is 00 and the y-axis coordinate is 00, X1=0, X2=0, Y1=0, and Y2=0. The acceleration structure generating apparatus 200 may generate a Morton code of the first primitive 811 as 0000 by combining the X-axis coordinate "00" and the y-axis coordinate "00" of the first primitive 811.

As another example, in the case of a second primitive 812, since the x-axis coordinate is 00 and the y-axis coordinate is 01, X1=0, X2=0, Y1=0, and Y2=1. The acceleration structure generating apparatus 200 may generate a Morton code of the second primitive 812 as 0001 by combining the X-axis coordinate "00" and the y-axis coordinate "01" of the second primitive 812.

According to the above method, the acceleration structure generating apparatus 200 may generate a Morton code for each of the plurality of primitives included in the 3D space 800. Accordingly, Morton codes of 0000, 0001, 0011, 0100, 0111, 1000, 1010, 1100, 1101, 1110, 1111 may be respectively allocated to the first to eleventh primitives 811 to 821 included in the 3D space 800.

According to another embodiment, when the z-axis coordinate of the primitive is represented as Z1Z2, a Morton code of the primitive in the 3D space may be represented as X1Y1Z1X2Y2Z2. Each of Z1 and Z2 may be a binary bit representing each digit of a value representing the z-axis coordinate of the primitive by a binary number.

Figure 9:
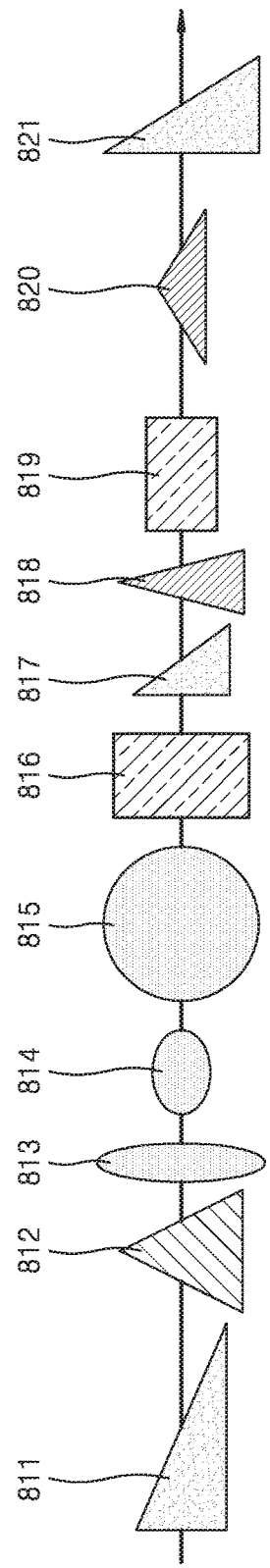
FIG. 9 is a diagram illustrating a method for arranging a plurality of primitives according to a linear code by the acceleration structure generating apparatus according to an example embodiment.

FIG. 9 is a diagram illustrating a method for arranging a plurality of primitives 811 to 821 according to a linear code by the acceleration structure generating apparatus 200 according to an embodiment.

Referring to FIG. 9, the acceleration structure generating apparatus 200 may arrange a plurality of primitives 811 to 821 according to their allocated linear codes. For example, the acceleration structure generating apparatus 200 may arrange the plurality of primitives 811 to 821 according to the size of the value of the linear code. When the acceleration structure generating apparatus 200 first arranges the primitives having the smaller linear code value, the plurality of primitives 811 to 821 may be arranged in the order of the first primitive 811, the second primitive 812, the third primitive 813, the fourth primitive 814, the fifth primitive 815, the sixth primitive 816, the seventh primitive 817, the eighth primitive 818, the ninth primitive 819, the tenth primitive 820, and the eleventh primitive 821 as illustrated in FIG. 9.

The acceleration structure generating apparatus 200 may select a reference primitive for classifying the plurality of arranged primitives 811 to 821 into a plurality of bounding boxes while sequentially including the plurality of arranged primitives 811 to 821 in the bounding box. For example, the acceleration structure generating apparatus 200 may calculate the increase rate of the size of the bounding box for each of the input primitives while sequentially including the plurality of arranged primitives 811 to 821 in the bounding box.

The acceleration structure generating apparatus 200 may select the primitive having the greatest increase rate based on the calculated increase rate. For example, when the first primitive is selected, the acceleration structure generating apparatus 200 may classify the plurality of arranged primitives into a first bounding box including the first primitive and a second bounding box including the second to eleventh primitives. Also, the acceleration structure generating apparatus 200 may classify the plurality of primitives 812 to 821 included in the second bounding box into other bounding boxes by repeatedly performing the above process on the plurality of primitives 812 to 821 included in the second bounding box.

Figure 10:
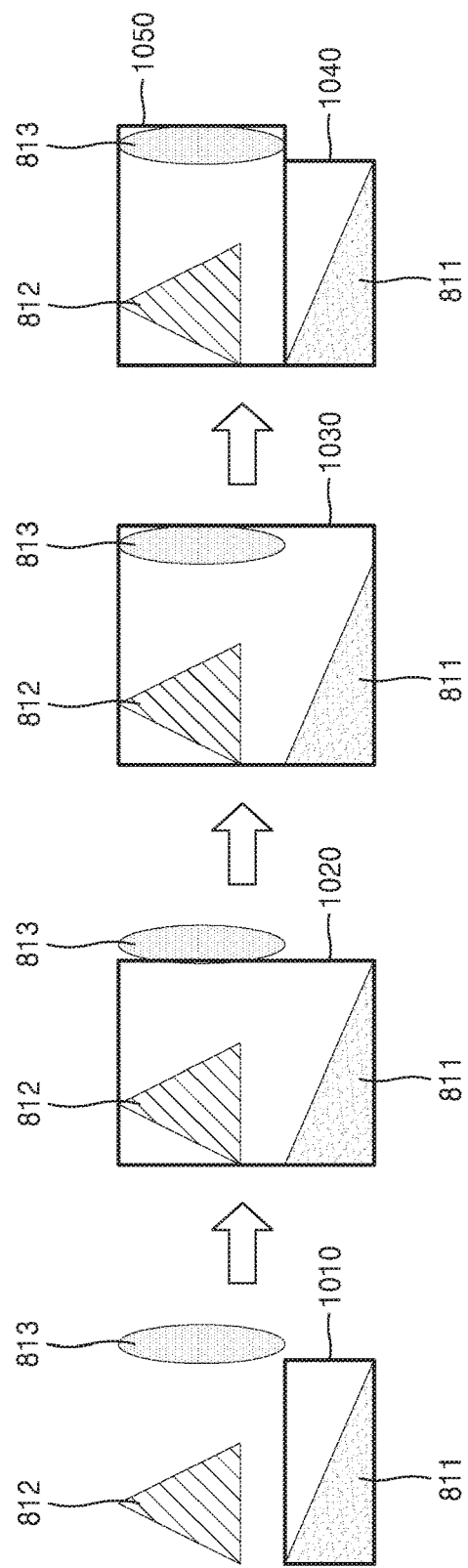
FIG. 10 is a diagram illustrating a method for selecting a primitive largest in terms of the increase rate of the size of a bounding box among a plurality of arranged primitives by the acceleration structure generating apparatus according to an example embodiment.

FIG. 10 is a diagram illustrating a method for selecting a primitive largest in terms of the increase rate of the size of a bounding box among a plurality of arranged primitives 811 to 821 by the acceleration structure generating apparatus 200 according to an embodiment.

For convenience of description, FIG. 10 only illustrates the first primitive 811, the second primitive 812, and the third primitive 813 among the plurality of primitives 811 to 821 arranged according to the linear code in FIG. 9.

According to an embodiment, the acceleration structure generating apparatus 200 may determine the size of a bounding box 1010 including the first primitive 811 located at the first among the plurality of arranged primitives 811 to 821. Also, the acceleration structure generating apparatus 200 may input the second primitive 812 arranged after the first primitive 811 into the bounding box 1010 including the first primitive 811. The acceleration structure generating apparatus 200 may determine the increase rate of the size of the bounding box with respect to the second primitive 812 by comparing the size of a bounding box 1020 including the first primitive 811 and the second primitive 812 with the size of the bounding box 1010 including the first primitive 811.

Also, the acceleration structure generating apparatus 200 may input the third primitive 813 into the bounding box 1020 including the first primitive 811 and the second primitive 812. The acceleration structure generating apparatus 200 may determine the increase rate of the size of the bounding box with respect to the third primitive 813 by comparing the size of a bounding box 1030 including the first primitive 811, the second primitive 812, and the third primitive 813 with the size of the bounding box 1020 including the first primitive 811 and the second primitive 812.

Also, with respect to each of the remaining primitives 814 to 821 among the plurality of arranged primitives 811 to 821, the acceleration structure generating apparatus 200 may repeatedly perform a process of inputting the primitive into the bounding box and determining the increase rate of the size of the bounding box.

The acceleration structure generating apparatus 200 may select the primitive having the greatest increase rate by comparing the respective increase rates of the plurality of primitives 811 to 821. In the present embodiment, it is assumed that the first primitive 811 has the greatest increase rate. Accordingly, the acceleration structure generating apparatus 200 may classify a plurality of primitives into the first bounding box including the first primitive 811 and the second bounding box including the second to eleventh primitives 812 to 821.

Also, the acceleration structure generating apparatus 200 may repeatedly perform a process of classifying the primitives included in each of the classified bounding boxes based on the increase rate of the size of the bounding box. For example, the acceleration structure generating apparatus 200 may select the primitive having the greatest increase rate among the second to eleventh primitives 812 to 821 included in the second bounding box. The acceleration structure generating apparatus 200 may classify the second to eleventh primitives 812 to 821 into the third bounding box and the fourth bounding box by the selected primitive.

Figure 11:
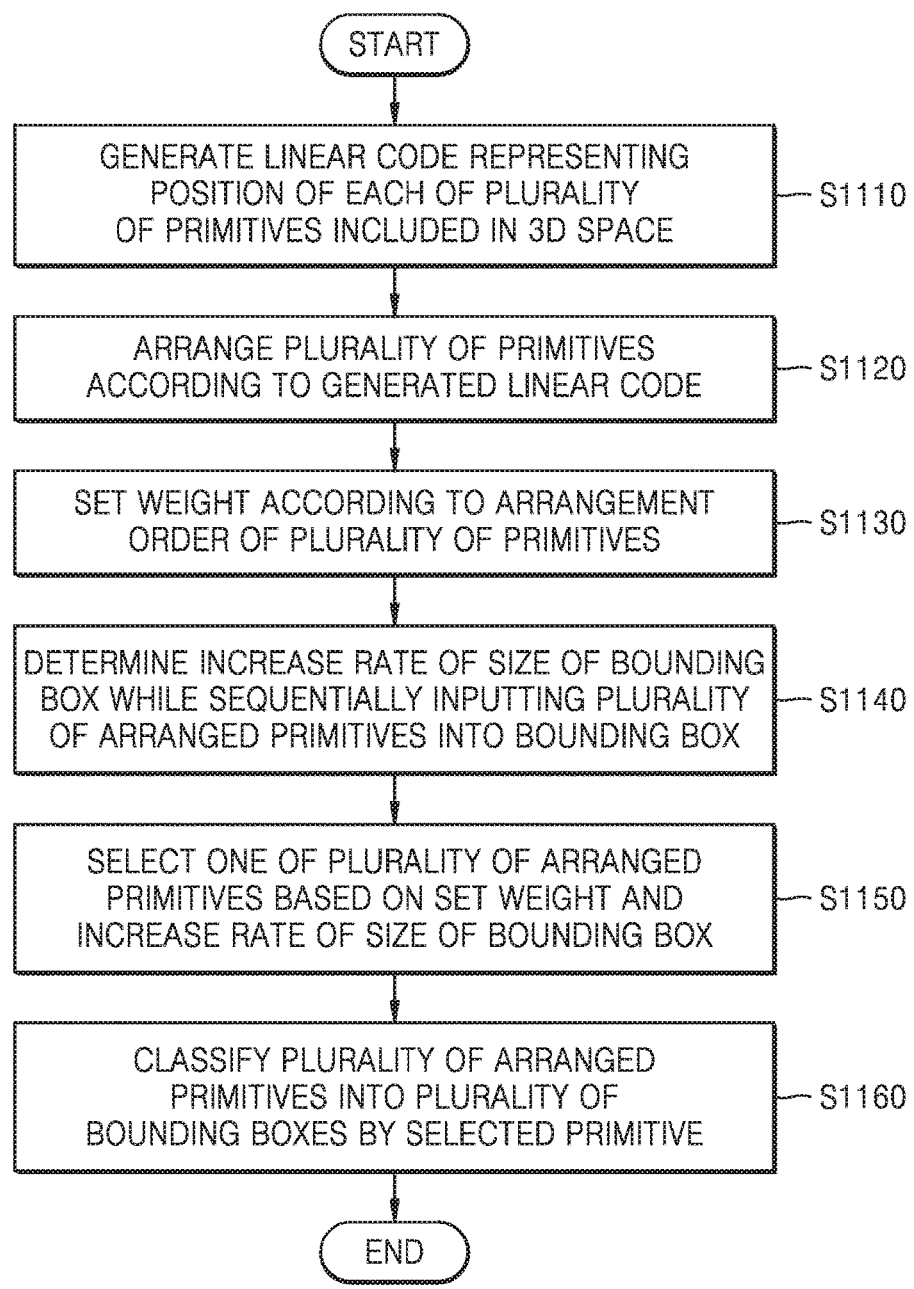
FIG. 11 is a flow diagram illustrating a method for classifying a plurality of primitives into a bounding box by using a weight set for each of a plurality of primitives by the acceleration structure generating apparatus according to an example embodiment.

FIG. 11 is a flow diagram illustrating a method for classifying a plurality of primitives into a bounding box by using a weight set for each of a plurality of primitives by the acceleration structure generating apparatus 200 according to an embodiment.

In operation S1110, the acceleration structure generating apparatus 200 may generate a linear code representing the position of each of a plurality of primitives included in a 3D space.

Operation S1110 may correspond to operation S710 described above with reference to FIG. 7.

In operation S1120, the acceleration structure generating apparatus 200 may arrange a plurality of primitives according to the generated linear code.

Operation S1120 may correspond to operation S720 described above with reference to FIG. 7.

In operation S1130, the acceleration structure generating apparatus 200 may set a weight according to the arrangement order of the plurality of primitives.

According to an embodiment, the acceleration structure generating apparatus 200 may determine the center of the arrangement order based on the number of the plurality of primitives. For example, when the number of the plurality of primitives is N, the acceleration structure generating apparatus 200 may determine the center of the arrangement order as N/2.

The acceleration structure generating apparatus 200 may set a higher weight for the primitive arranged near to the center of the arrangement order. For example, when the center "N/2" of the arrangement order is assumed as "M" and the arrangement order of each of the plurality of primitives is assumed as "i", the acceleration structure generating apparatus 200 may set a weight of i/M for the primitives with "i" of 1 to M and set a weight of (N−i)/M for the primitives with "i" of (M+1) to N.

However, this is merely an example, a method of setting the weight for each of the plurality of arranged primitives 811 to 821 by the acceleration structure generating apparatus 200 is not limited thereto.

In operation S1140, the acceleration structure generating apparatus 200 may determine the increase rate of the size of a bounding box while sequentially inputting the plurality of arranged primitives into the bounding box.

Operation S1140 may correspond to operation S730 described above with reference to FIG. 7.

In operation 1150, the acceleration structure generating apparatus 200 may select one of the plurality of arranged primitives based on the set weight and the increase rate of the size of the bounding box.

According to an embodiment, the acceleration structure generating apparatus 200 may compare the combination values of the weight and the increase rate of the size of the bounding box with respect to each of the plurality of primitives. For example, the acceleration structure generating apparatus 200 may compare the product values of the weight and the increase rate of the size of the bounding box with respect to each of the plurality of arranged primitives. Also, the acceleration structure generating apparatus 200 may select the primitive largest in terms of the product value of the weight and the increase rate of the size of the bounding box among the plurality of arranged primitives.

However, this is merely an example, and a method of selecting the primitive based on the weight and the increase rate of the size of the bounding box by the acceleration structure generating apparatus 200 is not limited thereto.

In operation S1160, the acceleration structure generating apparatus 200 may classify the plurality of arranged primitives into a plurality of bounding boxes by the selected primitive.

Operation S1160 may correspond to operation S750 described above with reference to FIG. 7.

Figure 12:
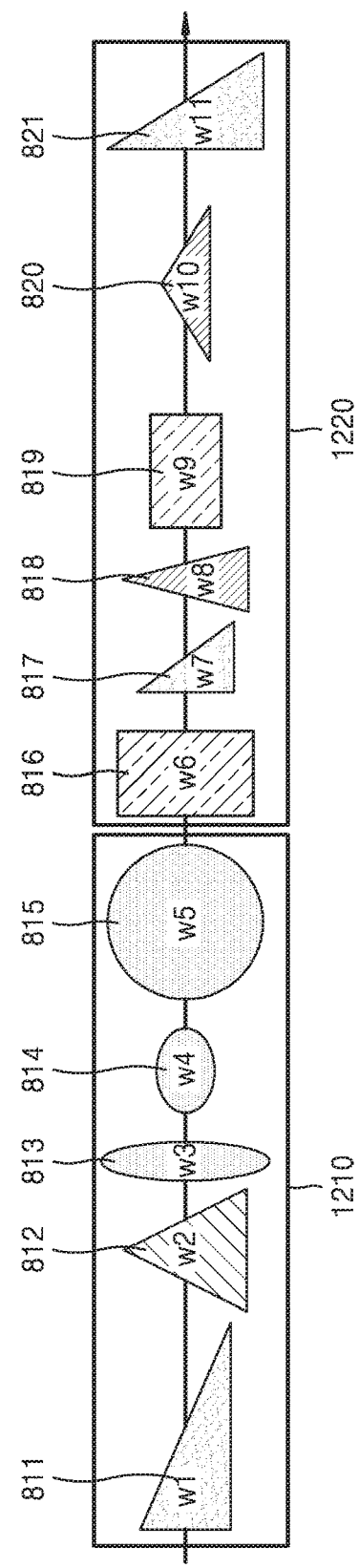
FIG. 12 is a diagram illustrating a method for classifying a plurality of primitives into a bounding box by using a weight set for each of a plurality of primitives by the acceleration structure generating apparatus according to an example embodiment.

FIG. 12 is a flow diagram illustrating a method for classifying a plurality of primitives into a bounding box by using a weight set for each of a plurality of primitives 811 to 821 by the acceleration structure generating apparatus 200 according to an embodiment.

Referring to FIG. 12, the acceleration structure generating apparatus 200 may arrange a plurality of primitives 811 to 821 according to a linear code. It is assumed that the plurality of primitives 811 to 821 in FIG. 12 are arranged in the same way as in the method described above with reference to FIG. 9.

The acceleration structure generating apparatus 200 may determine a weight for each of the plurality of arranged primitives 811 to 821 according to the arrangement order. For example, the acceleration structure generating apparatus 200 may determine the weights of the plurality of primitives 811 to 821 such that the weight of the primitive arranged near to the center of the arrangement order has a greater value than the weight of the primitive arranged distant from the center of the arrangement order.

When the number of the plurality of primitives is N, the acceleration structure generating apparatus 200 may determine the center of the arrangement order as N/2. In the present embodiment, it is assumed that the center of the arrangement order is "5.5" that is obtained by dividing the number "11" of the plurality of primitives 811 to 821 by "2".

The acceleration structure generating apparatus 200 may set a weight of i/5.5 for each of the primitives arranged from the first to the fifth. Herein, "i" may refer to the arrangement order. Accordingly, the weights "w1, w2, w3, w4, and w5" of the first to fifth primitives 811 to 815 may be respectively set as 1/5.5, 2/5.5, 3/5.5, 4/5.5, and 5/5.5. Also, the acceleration structure generating apparatus 200 may set a weight of (N−i)/M for the primitives arranged from the sixth to the eleventh. Accordingly, the weights "w6, w7, w8, w9, w10, and w11" of the sixth to eleventh primitives 816 to 821 may be respectively set as 5/5.5, 4/5.5, 3/5.5, 2/5.5, 1/5.5, and 0.

According to an embodiment, the acceleration structure generating apparatus 200 may compare the combination values of the weight and the increase rate of the size of the bounding box with respect to each of the plurality of primitives 811 to 821. For example, the acceleration structure generating apparatus 200 may compare the product values of the weight and the increase rate of the size of the bounding box with respect to each of the plurality of arranged primitives. Also, the acceleration structure generating apparatus 200 may select the primitive largest in terms of the product value of the weight and the increase rate of the size of the bounding box among the plurality of arranged primitives. For example, the increase rate of the first primitive 811 among the plurality of primitives 811 to 821 may have the greatest value; however, when the product of the weight and the increase rate of the size of the bounding box of the fifth primitive 815 has the greatest value, the fifth primitive 815 may be selected.

When the fifth primitive 815 is selected, the acceleration structure generating apparatus 200 may classify the plurality of primitives 811 to 821 into a first bounding box 1210 including the first to fifth primitives 811 to 815 and a second bounding box 1220 including the sixth to eleventh primitives 816 to 821. Also, the acceleration structure generating apparatus 200 may repeatedly perform a process of classifying the primitives based on the weight and the increase rate of the size of the bounding box, with respect to the primitives included in each of the first bounding box 1210 and the second bounding box 1220.

According to an embodiment, the acceleration structure generating apparatus 200 may mitigate or prevent the increase of a depth value of the acceleration structure by classifying the plurality of primitives 811 to 821 by using the increase rate of the size of the bounding box together with the weight determined according to the arrangement order of the plurality of primitives 811 to 821.

The above method may be written as a program executable by a computer and may be implemented in a general-purpose digital computer that executes the program by using a computer-readable recording medium. Also, the data structure used in the above method may be written on a computer-readable recording medium through various means. Examples of the computer-readable recording medium may include magnetic storage mediums (e.g., ROMs, RAMs, USBs, floppy disks, and hard disks) and optical recording mediums (e.g., CD-ROMs and DVDs).

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method for generating an acceleration structure used for ray tracing by at least one processor, the method comprising:
   generating a linear code, the linear code representing a position of each of a plurality of primitives included in a three-dimensional (3D) space;
   arranging the plurality of primitives according to the generated linear code;
   determining a rate of change of a size of a generated bounding box while sequentially inputting the plurality of arranged primitives into the generated bounding box;
   selecting one of the plurality of arranged primitives based on the rate of change of the size of the generated bounding box; and
   classifying the plurality of arranged primitives into a plurality of determined bounding boxes according to the selected primitive.

2. The method of claim 1, wherein the determining comprises:
   inputting a second primitive arranged next a first primitive into a bounding box including the first primitive among the plurality of arranged primitives; and
   determining an increase rate of the bounding box including the first primitive and the second primitive with respect to the bounding box including the first primitive.

3. The method of claim 1, wherein the selecting selects a primitive associated with a largest change in size of the generated bounding box among the plurality of arranged primitives.

4. The method of claim 1, wherein the position of each of the plurality of primitives is based on coordinate information of a center of the each of the plurality of primitives primitive in the 3D space.

5. The method of claim 1, wherein the classifying classifies the plurality of arranged primitives into a first bounding box and a second bounding box, the first bounding box including the selected primitive and at least one primitive arranged before the selected primitive and the second bounding box including at least one primitive arranged after the selected primitive.

6. The method of claim 5, further comprising:
   generating a first node corresponding to the first bounding box and a second node corresponding to the second bounding box; and
   adding the first node and the second node as child nodes of the acceleration structure.

7. The method of claim 1, further comprising:
   setting a weight based on the arranging,
   wherein the selecting selects one of the plurality of arranged primitives based on the set weight and the rate of change of the size of the generated bounding box.

8. The method of claim 7, wherein the setting decreases the weight from a center of an arrangement order of the plurality of arranged primitives.

9. The method of claim 1, wherein the linear code comprises a Morton code.

10. An apparatus for generating an acceleration structure used for ray tracing, the apparatus comprising:

a memory storing the acceleration structure and information about a position of each of a plurality of primitives included in a three-dimensional (3D) space; and a processor configured to arrange the plurality of primitives according to a linear code, the linear code based on the information about the position of each of the plurality of primitives, determine a rate of change of a size of a generated bounding box while sequentially inputting the plurality of arranged primitives into the generated bounding box, select one of the plurality of arranged primitives based on the rate of change of the size of the generated bounding box, and classify the plurality of arranged primitives into a plurality of determined bounding boxes according to the selected primitive.

11. The apparatus of claim 10, wherein the processor inputs a second primitive arranged next a first primitive into a bounding box including the first primitive among the plurality of arranged primitives, and determines an increase rate of the bounding box including the first primitive and the second primitive with respect to the bounding box including the first primitive.

12. The apparatus of claim 10, wherein the processor is configured to select a primitive associated with a largest change in size of the generated bounding box among the plurality of arranged primitives.

13. The apparatus of claim 10, wherein the position of each of the plurality of primitives is based on coordinate information of a center of the each of the plurality of primitives the primitive in the 3D space.

14. The apparatus of claim 10, wherein the processor is configured to classify the plurality of arranged primitives into a first bounding box and a second bounding box, the first bounding box including the selected primitive and at least one primitive arranged before the selected primitive and the second bounding box including at least one primitive arranged after the selected primitive.

15. The apparatus of claim 14, wherein the processor is configured to generate a first node corresponding to the first bounding box and a second node corresponding to the second bounding box, and add the first node and the second node as child nodes of the acceleration structure.

16. The apparatus of claim 10, wherein the processor is configured to set a weight based on an arrangement order of the plurality of arranged primitives, and select one of the plurality of arranged primitives based on the set weight and the rate of change of the size of the generated bounding box.

17. The apparatus of claim 16, wherein the processor is configured to decrease the weight from a center of the arrangement order of the plurality of arranged primitives.

18. The apparatus of claim 10, wherein the linear code comprises a Morton code.

19. A non-transitory computer-readable recording medium that stores a program,
when executed by a computer, causes the computer to perform the method of claim 1.

20. The method of claim 1, wherein the change of the size of the bounding box is a change in surface area of the bounding box.

* * * * *